US011869262B1

(12) United States Patent
Borenstein et al.

(10) Patent No.: US 11,869,262 B1
(45) Date of Patent: Jan. 9, 2024

(54) SYSTEM FOR ACCESS CONTROL OF IMAGE DATA USING SEMANTIC DATA

(71) Applicant: AMAZON TECHNOLOGIES, INC., Seattle, WA (US)

(72) Inventors: Eran Borenstein, Los Gatos, CA (US); Noam Sorek, Herzliya (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 786 days.

(21) Appl. No.: 16/828,647

(22) Filed: Mar. 24, 2020

(51) Int. Cl.
*G06V 30/262* (2022.01)
*G06F 3/0484* (2022.01)
*G06T 5/00* (2006.01)
*G06T 7/13* (2017.01)
*G06V 20/40* (2022.01)
*G06F 18/21* (2023.01)
*G06N 3/02* (2006.01)

(52) U.S. Cl.
CPC .......... *G06V 30/274* (2022.01); *G06F 3/0484* (2013.01); *G06F 18/21* (2023.01); *G06T 5/002* (2013.01); *G06T 7/13* (2017.01); *G06V 20/40* (2022.01); *G06N 3/02* (2013.01); *G06T 2207/10016* (2013.01); *G06T 2207/20084* (2013.01)

(58) Field of Classification Search
CPC .... G06V 30/274; G06V 20/40; G06F 3/0484; G06K 9/6217; G06T 5/002; G06T 7/13; G06T 2207/10016; G06T 2207/20084; G06N 3/02
See application file for complete search history.

(56) References Cited

U.S. PATENT DOCUMENTS

| 10,623,680 B1* | 4/2020 | Rangasamy | ........... G06V 20/40 |
| 2015/0296170 A1* | 10/2015 | Farrell | ................. G06V 30/194 386/254 |

(Continued)

OTHER PUBLICATIONS

Aslett, Louis J.M., et al., "A review of homomorphic encryption and software tools for encrypted statistical machine learning", Department of Statistics, University of Oxford, Aug. 26, 2015, 21 pgs. Retrieved from the Internet: URL: https://arxiv.org/pdf/1508.06574.pdf.

(Continued)

*Primary Examiner* — Christopher M Brandt
(74) *Attorney, Agent, or Firm* — Lindauer Law, PLLC (57) ABSTRACT

An image is processed to determine semantic data about what is depicted in that image. The semantic data provides information about location in the image and semantic category of an object depicted within the image. The semantic categories may include "background", "face", "text", "clothing", "exercise", and so forth. The semantic data may then be used to facilitate distribution of image data while limiting the information shared. For example, the semantic data may indicate the placement and position of a user exercising in first video data. Using the semantic data, second video data may be produced that obscures or replaces parts of the image that do not depict the user exercising. The second video data may then be used for providing feedback to the user, while preventing disclosure of other people, background, and so forth that are depicted in the first video data.

21 Claims, 5 Drawing Sheets

(56) References Cited

U.S. PATENT DOCUMENTS

| | | | | |
|---|---|---|---|---|
| 2015/0332439 | A1* | 11/2015 | Zhang | G06V 20/52 345/647 |
| 2017/0185808 | A1* | 6/2017 | Zhang | G06F 21/84 |
| 2018/0189505 | A1* | 7/2018 | Ghafourifar | G06F 21/6209 |
| 2018/0365809 | A1* | 12/2018 | Cutler | H04N 5/23216 |
| 2019/0068895 | A1* | 2/2019 | Hutz | G06K 9/6274 |
| 2019/0122046 | A1* | 4/2019 | Wantland | G06N 20/00 |
| 2019/0188830 | A1* | 6/2019 | Edwards | G06T 5/002 |
| 2020/0077035 | A1* | 3/2020 | Yao | G06V 20/52 |
| 2020/0098096 | A1* | 3/2020 | Moloney | G06V 20/584 |
| 2020/0250401 | A1* | 8/2020 | Kaneishi | G06V 40/16 |

OTHER PUBLICATIONS

Badawi, Ahmad Al, et al., "The AlexNet Moment for Homomorphic Encryption: HCNN, the First Homomorphic CNN on Encrypted Data with GPUs", Institute for Infocomm Research (I2R), A*STAR, Singapore, Feb. 4, 2019, 25 pgs. Retrieved from the Internet: URL: https://eprint.iacr.org/2018/1056.pdf.

Bazarevsky, Valentin, et al., "Mobile Real-time Video Segmentation", Google AI Blog, Google Research. Mar. 1, 2018, 6 pgs. Retrieved from the Internet: URL: https://ai.googleblog.com/2018/03/mobile-real-time-video-segmentation.html.

Brown, Liza, "Face Changer: How to Replace Faces in Video", Wondershare Filmora9, Dec. 17, 2019, 6 pgs. Retrieved from the Internet: URL: https://filmora.wondershare.com/video-editing-tips/change-face.html.

Chakraborty, Arunava., "PyTorch for Beginners: Semantic Segmentation using torchvision", Learn OpenCV, Jun. 5, 2019, 18 pgs. Retrieved from the Internet: URL: https://www.learnopencv.com/pytorch-for-beginners-semantic-segmentation-using-torchvision/.

Dowlin, Nathan, et al., "CryptoNets: Applying Neural Networks to Encrypted Data with High Throughput and Accuracy", Department of Mathematics, Princeton University & Microsoft Research, Redmond. 10 pgs. Retrieved from the Internet: URL: http://proceedings.mlr.press/v48/gilad-bachrach16.pdf.

Hesamifard, Ehsan, et al., "CryptoDL: Deep Neural Networks over Encrypted Data", Department of Computer Science and Engineering, University of North Texas & Department of Mathematics and Statistics, University of Saskatchewan, Nov. 14, 2017, 21 pgs. Retrieved from the Internet: URL: https://arxiv.org/pdf/1711.05189.pdf.

Hesse, Brendan, "Protect Your Privacy From Your Own Cloud Security Cameras", Lifehacker.com, Jan. 11, 2019, 5 pgs. Retrieved from the Internet: URL: https://lifehacker.com/protect-your-privacy-from-your-own-cloud- security-camer-1831684103.

Jordan, H., et al., "Adaptation of gender derived from biological motion", Salk Institute, Nat Neurosci, Jun. 2006; 9 (6):738-9. Epub May 21, 2006. 1 pg. Retrieved from the Internet: URL: https://www.ncbi.nlm.nih.gov/pubmed/16715080. (see demo here: https://www.youtube.com/watch?v=r0kLC-pridl).

Liu, Jia, et al., "FDDWNet: a lightweight Convolutional Neural Network for real-time semantic segmentation", National Engineering Research Center of Communications and Networking, Nanjing University of Posts & Telecommunications, P.R. China, Nov. 2, 2019, Version 1, 7 pgs. Retrieved from the Internet: URL: https://www.groundai.com/project/fddwnet-a-lightweight-convolutional-neural-network-for-real-time-sementic-segmentation/1.

Mallick, Satya, "Image Segmentation," Learn OpenCV, Nov. 5, 2018, 10 pgs. Retrieved from the Internet: URL: https://www.learnopencv.com/image-segmentation/.

Oliva, Aude, et al., "Building the Gist of a Scene: The Role of Global Image Features in Recognition", Department of Brain and Cognitive Sciences, MIT, Cambridge, USA, & Computer Sciences and Artificial Intelligence Laboratory. 2006 19 pgs. Retrieved from the Internet: URL: https://ocw.mit.edu/courses/brain-and-cognitive-sciences/9-459-scene-understanding-symposium-spring-2006/readings/900paper1.pdf.

Pfeuffer, Andreas, et al., "Semantic Segmentation of Video Sequences with Convolutional LSTMs", Institute of Measurement, Control, and Microtechnology, Ulm University, 89081 Ulm, Germany. DeepAI. May 3, 2019, 7 pgs. Retrieved from the Internet: URL: https://deepai.org/publication/semantic-segmentation-of-video-sequences-with-convolutional-lstms.

Tanaka, James W., et al., "The "parts and wholes" of face recognition: a review of the literature", Department of Psychology, University of Victoria, British Columbia, Mar. 4, 2016. 17 pgs. Retrieved from the Internet: URL: https://www.ncbi.nlm.nih.gov/pmc/articles/PMC5051945/.

Verdone, Antonio, "Real-time semantic image segmentation with DeepLab in Tensorflow" Antonio Verdone Blog, Mar. 13, 2018, 12 pgs. Retrieved from the Internet: URL: https://averdones.github.io/real-time-semantic-image-segmentation-with-deeplab-in-tensorflow/.

Zhao, Hengshuang, et al., "Pyramid Scene Parsing Network", The Chinese University of Hong Kong and Sensetime Group Limited, 2017, 7 pgs. Retrieved from the Internet: URL: https://hszhao.github.io/projects/pspnet/.

Zhongzheng, Ren, et al., "Learning To Anonymize Faces For Privacy Preserving Action Detection", EgoVid Inc, UC Davis, European Conference on Computer Vision (ECCV), 2018. 5 pgs. Retrieved from the Internet: URL: https://jason718.github.io/project/privacy/main.html.

Zhu, Jun-Yan, et al., "Unpaired Image-to-Image Translation using Cycle-Consistent Adversarial Networks", IEEE International Conference on Computer Vision (ICCV), 2017, Nov. 15, 2018. 18 pgs. Retrieved from the Internet: URL: https://arxiv.org/pdf/1703.10593.pdf.

* cited by examiner

SYSTEM FOR ACCESS CONTROL OF IMAGE DATA USING SEMANTIC DATA

BACKGROUND

Control over what information is accessible to others is critical to helping users maintain privacy.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Controlling access to information is critical to maintaining the privacy of users. A wide variety of devices produce both still and video image data. For example, a doorbell camera may provide video of a visitor, security cameras may provide video at a home or business, a camera may be used for videoconferencing, and so forth.

Traditionally the control over access to image data has been coarse, and has not considered the content of that image data. For example, a user has been limited to either providing image data or not. Continuing the example, if the user has provided a home security company with permission to view video from the security camera, such video has previously been provided without regard to the content of that video. This may introduce privacy concerns for family, visitors, or others within the camera's field of view.

Described in this disclosure are techniques and systems for providing access control to image data using semantic data. Image data is processed to determine semantic data that indicates the boundaries and semantic category or label of what is depicted in that image data. For example, the semantic data may describe boundaries within an image of objects and the semantic category(s) to which those objects belong. Semantic categories may include, but are not limited to, faces, people, fashion or clothing, action, text, and so forth.

Using the semantic data, portions of image data may be shared, obscured, removed, or otherwise processed based upon access control data set by a user. The access control data may specify a recipient who is permitted to receive image data associated with the allowed semantic category. For example, a user may specify that video from a doorbell camera may be provided to a home security company, but within that video the faces of known family members are obscured or removed. The system as described would process first video from the doorbell camera and produce second video. The second video sent to the recipient home security company would have the faces of recognized family members obscured or replaced while unknown or unidentified faces remain visible. This would allow a representative of the home security company or another automated system to use the second video.

By using the system described in this disclosure, extremely fine-grained control over the contents of still images and video data is possible. This results in significant improvements in privacy for end-users by restricting the distribution of information to those recipients that the end-user approves. By limiting the distribution of image data to recipients based on semantic data, a recipient is provided with information they need to provide a task, while additional information unnecessary to that task is not released. The limitation of data provided to recipients also provides substantial improvements in the information security of the end-users. For example, by limiting the distribution of information, the ability for an adversary to acquire a corpus of information and use that corpus to create synthetic data about a particular user is substantially reduced.

Illustrative System

Figure 1:
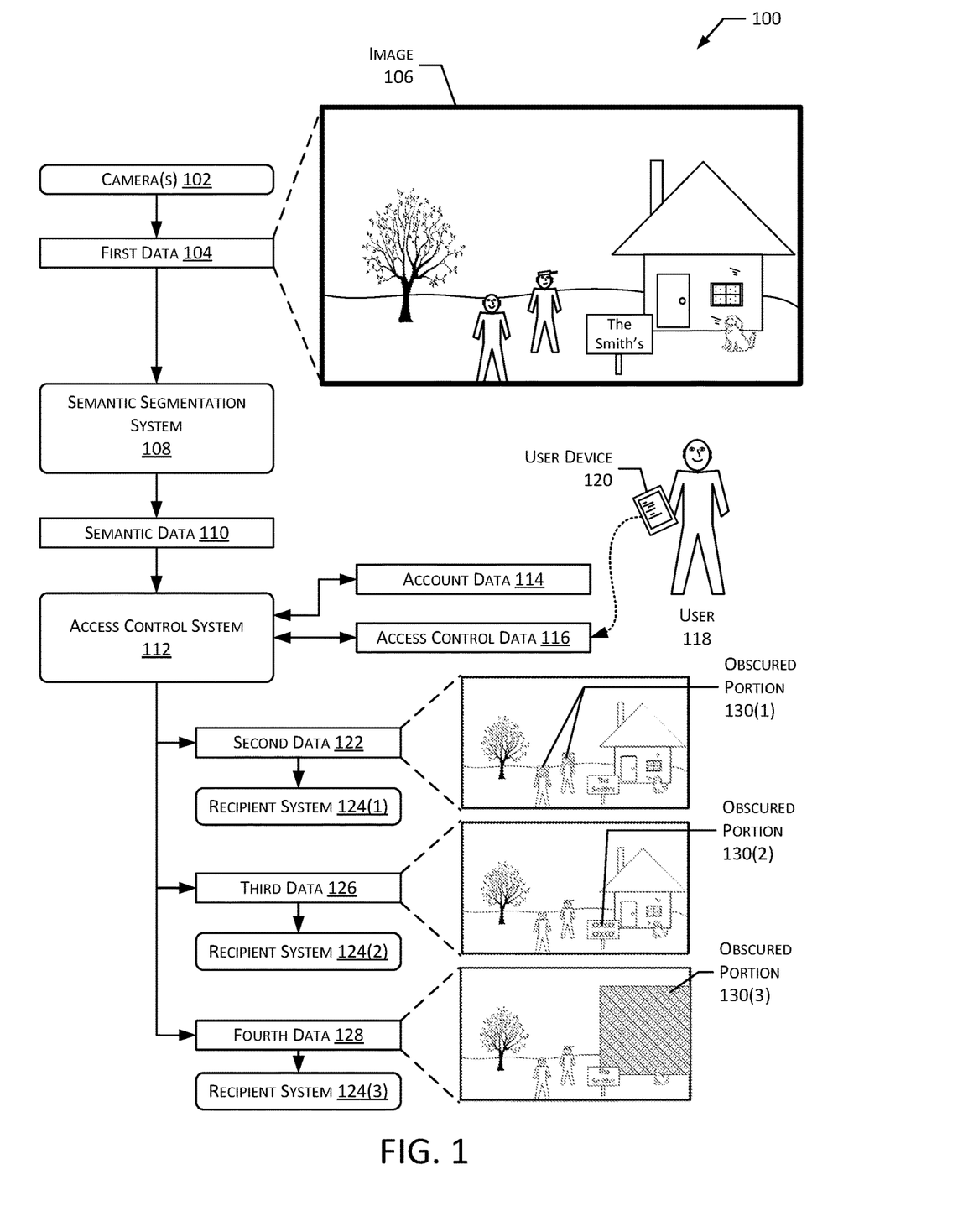
FIG. 1 illustrates a system for access control of image data using semantic data, according to some implementations.

FIG. 1 illustrates a system 100 for access control of image data using semantic data, according to some implementations. One or more cameras 102 generate first data 104. The camera 102 may be configured to detect light in one or more wavelengths including, but not limited to, terahertz, infrared, visible, ultraviolet, and so forth. For example, an infrared camera 102 may be sensitive to wavelengths between approximately 700 nanometers and 1 millimeter. The first data 104 may comprise one or more images 106. For example, the first data 104 may comprise a still image, video, and so forth. In some implementations the cameras 102 may provide depth or distance data as well. For example, the cameras 102 may provide stereovision, may use structured light, time of flight, or other techniques to generate depth data. In some implementations the camera 102 may be associated with one or more microphones (not shown). The microphone(s) may be used to acquire audio data. The first data 104 may comprise image data and audio data.

The camera 102 may include a processor, memory, communication interface, and so forth. For example, the camera 102 may be able to communicate using a network. The camera 102 may be a standalone device or may be part of another device. For example, the camera 102 may comprise an exterior security camera, a doorbell camera, a camera on a tablet computer, a camera on an Internet enabled home appliance, a camera on an autonomous vehicle, a camera on a remotely controlled vehicle, and so forth.

The first data 104 is provided to a semantic segmentation system 108. The semantic segmentation system 108 utilizes one or more techniques to determine semantic data 110 about the first data 104. The semantic data 110 provides information about what objects in particular semantic categories are depicted or present in the image, and where that object is. For example, the semantic data 110 may indicate that a person's face is present in the image 106, and a boundary of where that face is within the image 106. The semantic categories may include one or more of a face, a person, an identified person, an unidentified person, foreground, background, a type of room, a type of location, geographic location, an activity, an apparent emotional state, text, clothing, an animal, a specified type of object, a video display device, a window, and so forth. For example, the semantic category of "person" may determine the overall body of a human as depicted in the image 106. In another example, the activity semantic category may indicate that a person appears to be running, standing, and so forth. In yet another example, an apparent emotional state may be determined based on appearance of facial features, such as smiling, frowning, and so forth.

In some implementations the semantic data 110 may also provide information about sounds in audio data that is associated with the image 106. For example, the semantic data 110 may indicate a semantic category of sound such as "breaking glass", "speech", "running water", and so forth. In some implementations the semantic data 110 may include data produced by an automated speech recognition (ASR) system. For example, the semantic data 110 may include text representative of words spoken. In some implementations output from the ASR may be used to determine a semantic category based on speech. For example, the semantic categories may indicate "speech by unknown person", "conversation between known users", and so forth.

The semantic segmentation system 108 may utilize one or more techniques such as artificial neural networks (ANNs), convolutional neural networks (CNNs), active appearance models (AAMs), active shape models (ASMs), principal component analysis (PCA), cascade classifiers, and so forth to determine the semantic data 110. In some implementations the semantic segmentation system 108 may use a single technique, while in other implementations multiple techniques may be used. One technique the semantic segmentation system 108 may implement is a convolutional network in a pyramid scene parsing network configuration to generate at least a portion of the semantic data 110. The pyramid scene parsing network is described by Zhao, Hengshuang, et. al., (Apr. 27, 2017). "Pyramid Scene Parsing Network", arXiv:1612.01105. Another technique such as a neural network configured to provide a human parsing model may be used. For example, human parsing is described by Liang, Gon, Shen, and Lin, (Apr. 5, 2018). "Look into Person", arXiv:1804.01984. This configuration may be used to generate at least a portion of the semantic data 110.

The semantic data 110 for image data may include one or more of semantic segmentation at a pixel level, instance segmentation, panoptic segmentation, and so forth. For example, the semantic segmentation attempts to assign a semantic category to each pixel in the image 106. In comparison, the instance segmentation provides the boundary of an object. The output of instance segmentation may comprise a mask or outline of an object instead of a rectangular bounding box. Panoptic segmentation combines semantic segmentation and instance segmentation. Each pixel is assigned a semantic category and also a particular instance. For example, a semantic segmentation may indicate that a particular pixel is part of the semantic category "person", while the instance segmentation associates that particular pixel with person A as distinct from person B. Examples of semantic data 110 are discussed with regard to the following figures.

In some implementations, the semantic segmentation system 108 may include or may utilize one or more of a facial recognition system, biometric identification system, optical character recognition system, automated speech recognition system, and so forth. For example, faces determined by the semantic segmentation system 108 may be processed with a facial recognition system to determine if the person depicted is known or unknown. In some implementations the semantic data 110 may include data indicative of an identity of the person or object in the first data 104. The identity may be relative, such as distinguishing one person from another, or absolute such as asserting a particular identity of "Bob Smith, Jr.".

The semantic data 110 for audio data may include one or more of semantic segmentation at frame level, interval of time, sequence of utterances, and so forth. For example, the semantic segmentation attempts to assign a semantic category to a portion of audio that has a time window that extends from 1 second before to 1 second after an acquisition time of the image 106.

The semantic data 110 may be determined for image data alone, audio data alone, video data that includes audio data, a still image that is associated with audio data, and so forth.

The semantic data 110 is provided to an access control system 112. The access control system uses account data 114 and access control data 116 to control the dissemination of information. In one implementation, a user 118 may use a user device 120 such as a smartphone or a tablet computer to specify what data to share with which recipients. In another implementation, default access controls may be specified until user input is received that changes those settings. The account data 114 may comprise information such as camera identifiers that indicate which cameras 102 are associated with a particular user account, and may also refer to access control data 116. The access control data 116 may specify what data as specified by semantic categories may be shared with a specified recipient or group of recipients.

While the semantic data 110 is typically representative of objects, in some situations the semantic data 110 may be indicative of phenomena. For example, the semantic data 110 may indicate a semantic category of "sunlight" or "rainbow".

By using the semantic data 110, the access control system 112 is able to control distribution of information to recipients. The semantic data 110 provides information about what is in the image 106, while the access control system 112 determines who is allowed to have access to the portions of the image 106 associated with specified semantic categories. For example, the user 118 may specify that all of the first data 104 from a doorbell camera 102 may be available to family members, but any information provided to a home security service omits portions of images 106 that depict family members or text. These omitted portions may be obscured, replaced, or omitted altogether. For example, the faces of identified family members may be blurred or replaced with a placeholder image. This allows the home security service to provide their service while preventing information about who in the family is present in the image 106.

In the examples depicted in FIG. 1, the access control system 112 is receiving first data 104 from a camera 102 that is viewing an exterior scene. The access control data 116 indicates that the output from this camera 102 is be processed and the processed data is then provided to specified recipients as authorized by the user 118. For example, the access control data 116 indicates that faces are to be obscured in the second data 122 that is provided to a first recipient system 124(1). The first data 104 is processed by the access control system 112 to modify, redact, or otherwise change the specified semantic category of "face" as specified by the access control data 116. In this example, portions of the first data 104 that are determined to depict faces are replaced with bounding boxes in the second data 122 to provide obscured portions 130(1) that avoid disclosure of those faces to the first recipient system 124(1).

In some implementations the obscured portion 130 may comprise a tag, placeholder, token, specified value, and so forth. For example, the obscured portion 130 may be replaced with a single solid color. The mechanism of "filling in" or replacing the obscured portion 130 may be specified to maximize data compression. For example, a solid black rectangle may result in the second data 122 storing less data and thus being faster to send than a contoured shape filled with random noise.

The obscured portion 130 is depicted with respect to image data. In some implementations, the obscured portion 130 may comprise audio data. The obscured portion 130 of the audio data may comprise a tag, placeholder, placeholder data, and so forth. For example, if audio data comprising speech is to be suppressed, those portions of the audio data that include speech may be replaced with white noise.

Also shown in this example is that the access control data 116 indicates that text in the image is to be obscured in third data 126 that is provided to a second recipient system 124(2). In this example, the text appearing in the image 106 has been redacted and replaced with obscured portions 130(2) comprising generic text. The third data 126 thus omits the text depicted in the first data 104, preventing that information from reaching the second recipient system 124(2).

Likewise, the access control data 116 indicates that images of other buildings are not to be shared in fourth data 128 that is provided to a third recipient system 124(3). In this example, the fourth data 128 includes an obscured portion 130(3) that prevents disclosure of information about the neighboring structure to the third recipient system 124(3).

As mentioned above, the obscured portions 130 may be replaced with other data. For example, the other data may comprise output from a blurring algorithm, output from an edge detector algorithm, a previously stored image, null values, and so forth. In the implementation depicted here, the portion of the image data produced by the access control system 112 that is of an obscured portion 130 contains little or no usable information about the source portion in the first data 104. For example, the obscured portions 130 may be replaced with placeholder images that may represent a semantic category but are not based on the pixels present in the first data 104. Continuing the example, the portions of the "face" semantic category may be replaced in the second data 122 with a "smiley face" default graphic. While the default graphic indicates that a face is depicted, no details about the face in the underlying first data 104 are present in the second data 122. In another example, an edge detection algorithm may be used to generate output that represents the image as a black and white line drawing comprising edges. This significantly reduces the amount of visual information available, while still providing visual information which may be useful in some situations. Other types of filters or image processing may also be used.

In other implementations the obscured portions 130 may comprise a layer or overlay in which the image data is retained for subsequent use. For example, a redaction layer may prevent display of the obscured portion 130 to users with a first level of access while permitting viewing of the obscured portion 130 to users with a second level of access.

The obscured portions 130 may be replaced with synthetic data in some implementations. For example, the first data 104 or the particular portions corresponding to specified semantic categories may be processed with a generative adversarial network (GAN) to create synthetic data. The synthetic data may comprise data that is consistent with the semantic category of the original data in the first data 104 but is not the same. For example, a GAN may be used to replace a face of an actual person in the first data 104 with a synthetic face in the second data 122. For example, the first data 104 may be processed to determine feature vectors associated with the particular portion(s). Those feature vectors may then be used as input values to the GAN which provides as output synthetic data such as a synthetic face image. In some implementations the synthetic data may exhibit consistent movements, facial expressions, and so forth. For example, if the actual person in the first data 104 is smiling, the synthetic face would appear to be smiling as well in the second data 122.

The synthetic data may be configured to have a minimum difference in a feature vector space from the input values. For example, if the actual face has curly dark hair, the synthetic face may have straight red hair.

In some implementations, the semantic data 110 may include one or more confidence values. For example, each instance of an object and the corresponding semantic categories of that instance may be associated with a confidence value. The confidence value may be indicative of a likelihood that a correct semantic category is associated with the instance. In other implementations the confidence value may be indicative of a likelihood that a semantic boundary indicative of the edges of the object are correct. In some implementations, if one or more confidence values of the semantic segmentation are less than a threshold value, the corresponding portion(s) may be replaced with other data in the output from the access control system 112. For example, the portions of the first data 104 associated with semantic category confidence values less than a threshold value may be replaced or otherwise obscured as described above.

In some implementations one or more of the semantic segmentation system 108, the access control system 112, or portions thereof, may execute on one or more processors local to the camera 102. For example, the semantic segmentation system 108 may execute on a neural network processor that is within the same housing as the camera 102. The access control system 112 may also execute on a processor that is within the same housing as the camera 102. In other implementations, the first data 104 may be sent to another device for processing. For example, the first data 104 may be encrypted and sent to a server. The server may then execute one or more of the semantic segmentation system 108, the access control system 112, and so forth. The server may be connected to a local area network or may be accessed via a wide area network such as the internet.

By using the system described in this disclosure, the user 118 or other responsible party is able to tightly control the distribution of information present in images. This highly granular control helps maintain the privacy of those involved in operation of the service. The user 118 is able to restrict information such that particular recipients receive images that have the specific semantic categories of image data that they need to perform their role, and no more. This substantially improves the utility and privacy of image based systems and users of those systems.

Additionally, the same image data, such as from the same camera 102, may be processed and provided to various recipients with the appropriate access controls implemented to prevent disclosure of information unnecessary to the role of the recipient. For example, instead of maintaining a first camera for a security service, a second camera for a doorbell camera, and a third camera for monitoring children, a single camera 102 may be used and the information selectively distributed. This reduces the amount of network bandwidth needed for transmitting data, as well as reducing the count and complexity of cameras for installation and maintenance.

The system also allows troubleshooting of systems that utilize cameras 102 while maintaining privacy. For example, the user 118 may allow technical support personnel to access the camera 102 for testing, but impose access controls to limit dissemination of information.

Figure 2:
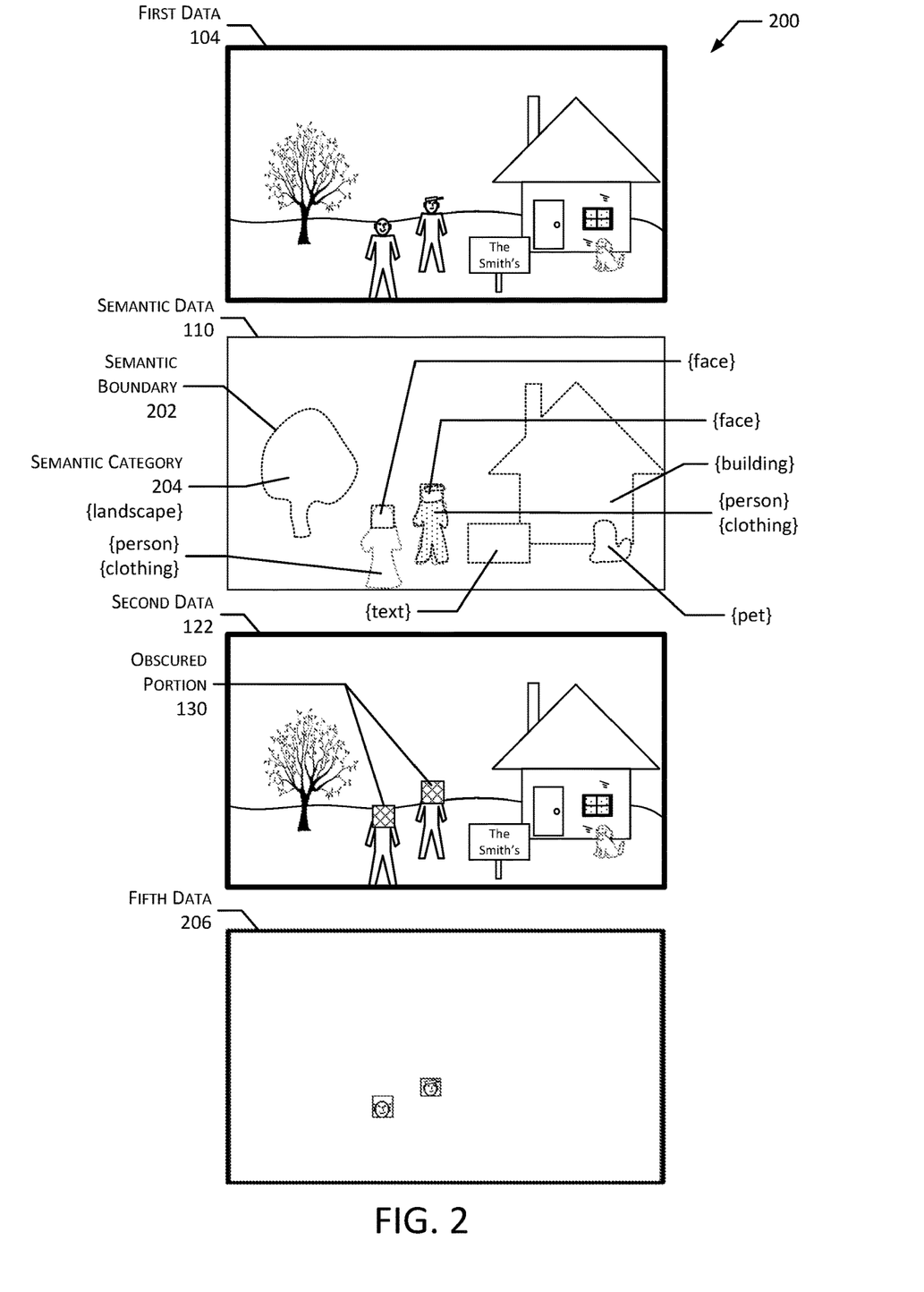
FIG. 2 illustrates first data, semantic data associated with that first data, and data generated based on the semantic data, the first data, and access control data, according to some implementations.

FIG. 2 illustrates at 200 the first data 104, semantic data 110 associated with that first data 104, and data generated based on the semantic data 110, the first data 104, and the access control data 116, according to some implementations.

An enlarged view of the first data 104 depicting a scene with various objects in various semantic categories is shown. The scene includes various objects such as a tree, people, a sign, a building, a dog, and a background.

A graphic depiction of semantic data 110 is provided. In this illustration each instance of a particular object associated with a semantic category is delineated by semantic boundary 202. The semantic boundary 202 may comprise a contour as depicted here, or may be a regular polygon such as a circle, rectangle, and so forth. The semantic boundaries 202 may be enlarged in some implementations. For example, a dilation algorithm may be used to increase the apparent size of the semantic boundary 202. Such dilation may reduce unintentional distribution of information that may occur in the event a boundary is incorrectly defined.

Associated with each instance are semantic categories 204 or labels that designate the semantic category 204 of a particular instance. A single instance may be associated with multiple semantic categories 204. For example, an image of a person may be associated with a "person" semantic category 204 and a "clothing" semantic category 204. In some implementations a portion of the first data 104 may be uncategorized. In such implementations, uncategorized objects may be obscured in data provided to a recipient system 124. The handling of uncategorized objects may be specified in the access control data 116. For example, the user 118 may select to obscure all uncategorized objects in the image 106.

An enlarged view of the second data 122 is depicted. In this view, per the access control data 116, the access control system 112 has obscured the portions of the first data 104 that have been designated in the semantic data 110 as representing faces. The remainder of the image remains unobscured.

Also shown is fifth data 206 that may be provided by the access control system 112. In some implementations the data provided to a recipient system 124 may consist of only those explicitly permitted semantic categories 204. For example, in this example the access control data 116 permits unrecognized faces to be provided to a security service. However, the rest of the image has been obscured. As a result, only the faces are visible in this fifth data 206.

In other implementations other techniques may be used. For example, those portions of the first data 104 that are associated with semantic categories 204 approved for distribution to a particular recipient system 124 may be extracted and provided as cropped or partial image data.

Figure 3:
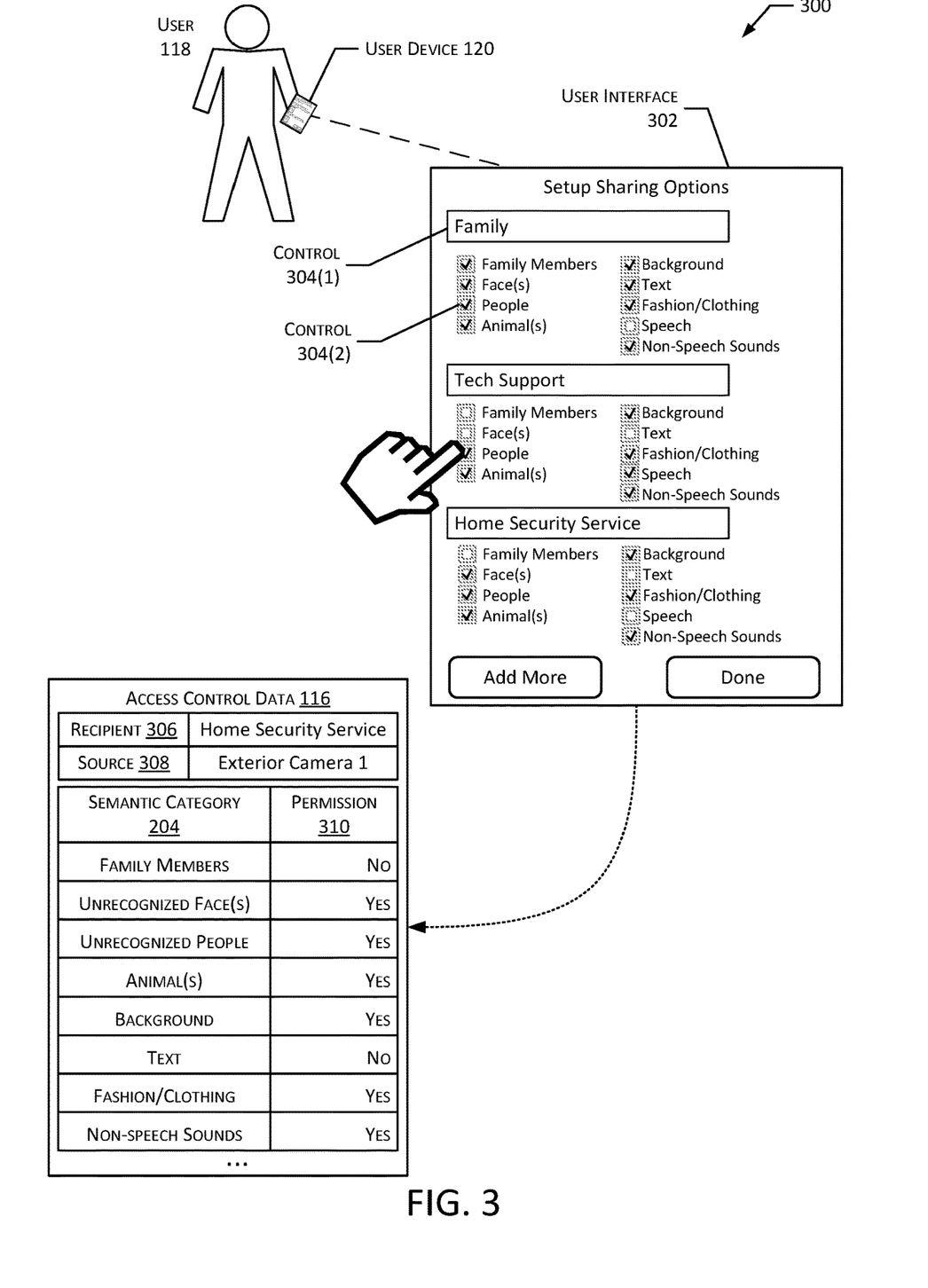
FIG. 3 illustrates a user interface to accept user input to specify access control data, according to some implementations.

FIG. 3 illustrates at 300 a user interface 302 to accept user input to specify access control data 116, according to some implementations. In the implementation depicted here, the user interface 302 may comprise a graphical user interface presented by a display of a user device 120. In other implementations the user interface may comprise a voice user interface. For example, the user 118 may speak aloud commands to specify the access control data 116.

Once a user 118 has been authenticated and has opted in to use the system 100, the user 118 may be presented with the user interface 302. The user interface 302 includes several controls 304. For example, a first control 304(1) may allow the designation or selection of a recipient. The recipient may comprise one or more recipient systems 124 that represent or are controlled by entities such as users, systems, companies, and so forth. A set of second controls 304(2) allow the user 118 to specify which semantic categories 204 are permitted to be provided to the recipient system 124 or are not permitted to be provided. The controls 304 may be used with semantic categories 204 of associated with different types of data. For example, the controls 304 may allow for the selection of semantic data 110 associated with image data, audio data, and so forth.

It is important to note that the designation of semantic categories 204 and subsequent control by the access control system 112 may work in conjunction with other access control systems. For example, a mobile device may be limited to enabling or disabling the acquisition of images 106 based on geographic location (geolocation). In another example, a camera 102 may have specified operational hours during which is it enabled to acquire images 106 and off hours during which acquisition of images is disabled.

The access control data 116 associated with these and other inputs is also shown. Recipient 306 data indicates the particular recipient system 124 that is associated with the set of access controls. Also specified is the source 308 data indicating the particular camera 102 or group of cameras. For example, the source 308 may specify a particular camera identifier, group of cameras, type of cameras, and so forth. Continuing the example, access control data 116 may be applied to the group "webcam" for all devices associated with use in videoconferencing. In the example shown here, the source 308 is specified to a particular camera 102, that is designated "exterior camera 1".

The access control data 116 may specify one or more semantic categories 204 and the associated permission 310 for that category. For example, the access control data 116 prevents sharing portions of the first data 104 having the semantic category 204 of "family members" with the "home security service". Continuing the example, portions of the first data 104 having the semantic category 204 of unrecognized faces are permitted to be shared, as are unrecognized people. The first data 104 may comprise image data, audio data, image data and associated audio data, and so forth.

In some implementations, the access control data 116 may be conditional. These conditions may be specified with respect to semantic categories 204 associated with one or more of image data, audio data, or a combination thereof. For example, the access control data 116 may specify that if an image contains an unrecognized face, the audio data is to be provided. However, if the semantic data 110 indicates that the image data contains only recognized users, the audio data would be obscured. In another example, the access control data 116 may specify that if an unrecognized voice is detected, portions of image data having the semantic category 204 of "unrecognized face" may be sent to the recipient system 124.

In other implementations, other techniques may be used to determine the access control data 116. For example, the user interface 302 may present the image 106. The user 118 may provide input such as using a mouse or touch sensor to select particular objects presented in the image 106, to draw a coarse bounding box around a particular object, and so forth. This input may then be used to determine an associated semantic category 204 and associated access control data 116. For example, a user 118 may draw a boundary around something presented in an image 106 that they explicitly want to provide access to. The semantic boundary 202 that is closest to the drawn boundary may then be used to select the semantic boundary 202 that is within the drawn boundary. In other implementations, other techniques may be used to select semantic categories 204 or particular objects depicted in an image 106.

Figure 4:
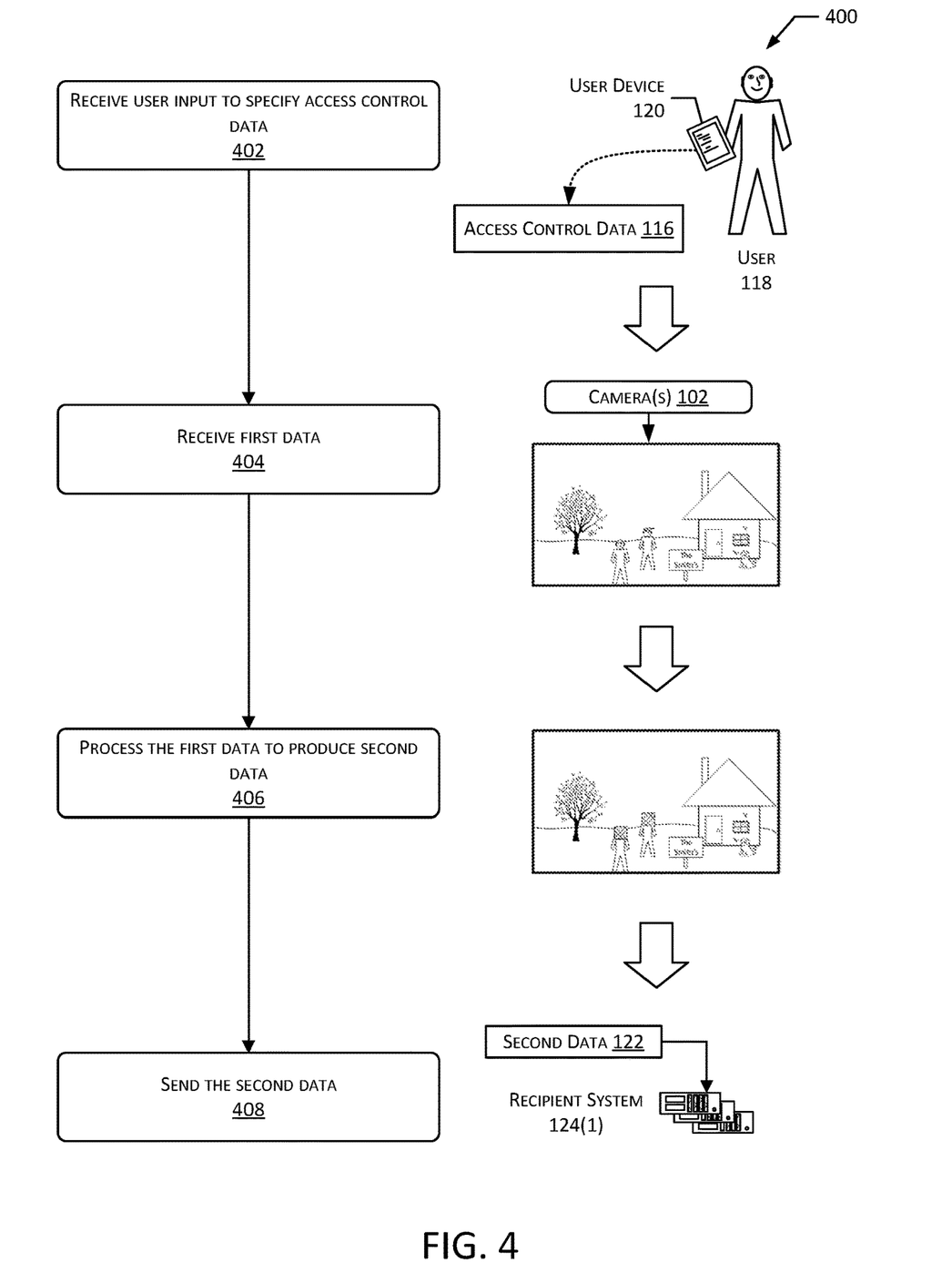
FIG. 4 illustrates a scenario in which a user specifies access controls to selectively provide image data, according to some implementations.

FIG. 4 illustrates a scenario 400 in which a user 118 specifies access control data 116 to selectively provide image data to recipients, according to some implementations. At 402 the user 118 uses the user device 120 to enter or modify the access control data 116, as described with regard to FIG. 3.

At 404 first data 104 is received. For example, the camera 102 may be enabled and may begin sending first data 104 to the semantic segmentation system 108.

At 406 the first data 104 is processed to produce the second data 122. For example, the semantic data 110 from the semantic segmentation system 108 is compared to the access control data 116 to determine which semantic categories 204 may be provided to the specified recipient system 124. The second data 122 is generated, based on the first data 104. For example, the obscured portions 130 of the first data 104 are removed and replaced with placeholder images such as rectangular patterned boxes, to produce the second data 122.

At 408 the second data 122 is provided to the recipient systems 124 that is permitted to receive that data. For example, the second data 122 may be provided to the recipient system 124(1) of the "home security service".

The system 100 may be used to facilitate acquisition of data for other uses. In one implementation, the system 100 may be used for clothing selection. For example, the user 118 may use a camera 102 to acquire an image of themselves wearing particular attire. The user 118 may set access control data 116 to permit only the portion of the image data that is associated with the semantic category 204 "clothing" to be sent to a recipient system 124. The recipient system 124 may then use the data to propose clothing selection.

In another implementation, the system 100 may be used to facilitate fitness activities. For example, the user 118 may use a camera 102 to acquire video of themselves engaging in a fitness activity such as stretching, exercising, and so forth. The user 118 may set access control data 116 to permit only the portion of the image data that is associated with the semantic category 204 of "exercise activity" to be shared with a recipient system 124. The recipient system 124 may then use the data to assess performance of the exercise, provide feedback, and so forth.

Figure 5:
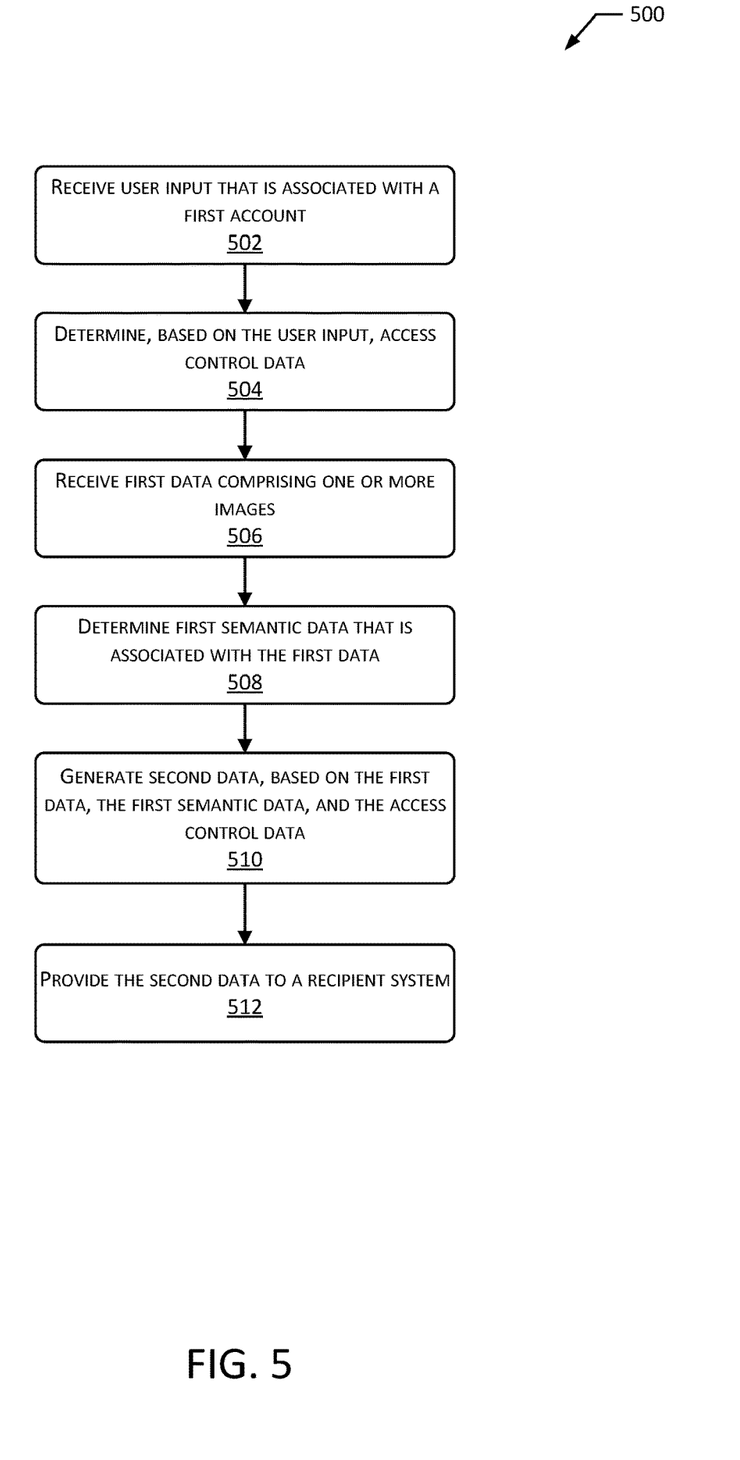
FIG. 5 is a flow diagram of a process for selectively providing image data, according to some implementations.

FIG. 5 is a flow diagram 500 of a process for selectively providing image data, according to some implementations. The process may be implemented at least in part by one or more processors associated with the camera 102, servers, computing devices, and so forth. Data transferred during the process may be encrypted and decrypted. Discussion of encryption and decryption is omitted from the following discussion for clarify, and not as a limitation.

At 502 user input is received that is associated with a first account. For example, the user 118 may use a user device 120 to be authenticated and gain access to their account data 114. The user input may specify one or more semantic categories 204 and permissions associated with those semantic categories 204 with respect to a recipient system 124 or group.

At 504, based on the user input, access control data 116 is determined. For example, the access control data 116 may be generated by default upon initial setup of the account data 114 for that user 118. The user 118 may then add or change the access control data 116 based on their user input.

At 506, first data 104 comprising one or more images 106 is received by the semantic segmentation system 108. The first data 104 may comprise one or more of still images or video images. The first data 104 may include, or be associated with, a camera identifier. For example, the camera identifier may comprise a media access control, serial number, encrypted value, or other information that designates the camera 102.

At 508 first semantic data 110 is determined that is associated with the first data 104. For example, the semantic segmentation system 108 processes the first data 104 to generate the semantic data 110.

At 510 second data 122 is generated based on the first data 104, the first semantic data 110, and the access control data 116. For example, the access control data 116 may specify that a particular recipient system 124 is permitted to receive only image data associated with specifically permitted semantic categories 204. The first data 104 may be processed to obscure or redact the portions of the images 106 that are not part of those specifically permitted semantic categories 204, with the result being the second data 122. For example, the second data 122 may consist of only those portions of the first data 104 that are associated with semantic categories 204 for which the recipient system 124 is permitted access.

At 512 the second data 122 is provided to the recipient system 124 that is permitted to have access to that data. In one implementation the second data 122 may be sent to the recipient system 124. In another implementation the second data 122 may be stored and a uniform resource identifier (URI), network address, key value, or other information used to retrieve the second data 122 may be provided to the recipient system 124.

In some implementations at least a portion of the semantic data 110 may be provided to the recipient system 124. For example, information about which portions of the second data 122 comprise synthetic data may be provided. This information may then be used by the recipient system 124 for further processing. For example, if a portion of the second data 122 is designated as the semantic category 204 of face and indicates that data has been obscured, the recipient system 124 would not attempt facial recognition on that obscured portion 130. The access control data 116 may specify whether semantic data 110 or information derived therefrom may be provided to one or more recipient systems 124.

In another example, semantic data 110 indicative of an activity, such as "running" may be provided to the recipient system 124. This may facilitate the recipient system 124 or an operator thereof to more quickly process the data. Continuing the example, the fourth data 128 may indicate that from frames 491 to 553 "person running" appeared, allowing for that portion to be selectively played back and reviewed by a human operator.

In another implementation, no image data may be provided to a recipient system 124. Instead, a portion of the semantic data 110 may be provided. For example, no image data may be provided from a camera 102 within a residence, but semantic data 110 indicative of an unidentified person may be provided to a recipient system 124.

The techniques and systems described in this disclosure may be used in many settings. For example, the system may be used to prevent unintentional disclosure in video content of specified individuals, ensuring their privacy. In another example, the system may be used to allow a user 118 to share image-based medical data while obscuring or removing some aspects of that data.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more memories storing computer-executable instructions; and
   one or more processors to execute the computer-executable instructions to:
   access first video data comprising a first set of images;
   determine a first account associated with the first video data;
   process the first video data with a first neural network to determine first semantic data, wherein the first semantic data associates a first semantic category with a first portion of individual ones of the first set of images and a second semantic category with a second portion of the individual ones of the first set of images;
   determine access control data associated with the first account;
   determine the access control data permits distribution of information associated with the first semantic category to a first recipient and does not permit distribution of information associated with the second semantic category;
   generate, based on the first video data, the first semantic data, and the access control data, second video data comprising the first portion of the individual ones of the first set of images and omitting the second portion of the individual ones of the first set of images; and
   provide the second video data to the first recipient.

2. A method performed by one or more computing devices, the method comprising:
   accessing first data comprising one or more images;
   processing the first data to determine semantic data indicative of a first portion of individual ones of the one or more images and a first semantic category associated with the first portion;
   determining access control data associated with the first data, wherein the access control data specifies a first recipient is permitted to receive data associated with the first semantic category;
   generating second data based on the first data, the semantic data, and the access control data; and
   providing the second data to the first recipient.

3. The method of claim 2, wherein:
   the first data comprises video data obtained from a first camera,
   a first camera identifier is associated with the first data, and the determining the access control data comprises retrieving the access control data from storage using the first camera identifier.

4. The method of claim 2, further comprising:
presenting a user interface;
receiving user input from the user interface; and
generating the access control data based on the user input.

5. The method of claim 2, wherein the first semantic category is indicative of one or more of:
a face,
a person,
an identified person,
an unidentified person,
foreground,
background,
a type of room,
a type of location,
geographic location,
an activity,
an apparent emotional state,
text,
clothing,
an animal,
a specified type of object,
a video display device, or
a window.

6. The method of claim 2, wherein the processing the first data uses a pyramid scene parsing network.

7. The method of claim 2, wherein the second data consists of only the first portion of the individual ones of the one or more images.

8. The method of claim 2, wherein the semantic data is further indicative of a second portion of the individual ones of the one or more images and a second semantic category associated with the second portion; and the method further comprising:
determining that the access control data associated with the first data specifies the first recipient is not permitted to receive data associated with the second semantic category;
wherein the generating the second data comprises replacing the second portion of the individual ones of the one or more images with other data, wherein the other data comprises one or more of:
output from a blurring algorithm,
output from an edge detector algorithm,
a previously stored image, or
null values.

9. The method of claim 2, further comprising:
processing at least part of the first data to determine a first set of feature vectors associated with the first portion;
generating synthetic data using the first set of feature vectors as input to a generative adversarial network; and
wherein the generating the second data comprises replacing the first portion of the individual ones of the one or more images with the synthetic data.

10. The method of claim 2, further comprising:
sending at least a portion of the semantic data to the first recipient.

11. The method of claim 2, wherein the semantic data is indicative of a second portion of the individual ones of the one or more images and a second semantic category associated with the second portion; and the method further comprising:
determining that the access control data associated with the first data specifies a second recipient is permitted to receive data associated with the second semantic category;
wherein the second data omits the second portion;
generating third data based on the first data, the semantic data, and the access control data, wherein the third data omits the first portion; and
sending the third data to the second recipient.

12. The method of claim 2, further comprising:
determining a confidence value that is indicative of a likelihood that the first semantic category is correctly associated with the first portion;
determining the confidence value is less than a threshold value; and
wherein the generating the second data comprises replacing the first portion of the individual ones of the one or more images with other data, wherein the other data comprises one or more of:
output from a blurring algorithm,
output from an edge detector algorithm,
a previously stored image, or
null values.

13. A system comprising:
one or more memories storing computer-executable instructions; and
one or more processors to execute the computer-executable instructions to:
access first data comprising one or more images;
process the first data to determine semantic data indicative of a first portion of individual ones of the one or more images and a first semantic category associated with the first portion;
determine access control data associated with the first data, wherein the access control data specifies a first recipient is permitted to receive data associated with the first semantic category;
generate second data based on the first data, the semantic data, and the access control data; and
provide the second data to the first recipient.

14. The system of claim 13, further comprising instructions to:
receive user input from a user interface; and
generate the access control data based on the user input.

15. The system of claim 13, wherein the second data consists of only the first portion of the individual ones of the one or more images.

16. The system of claim 13, wherein the semantic data is further indicative of a second portion of the individual ones of the one or more images and a second semantic category associated with the second portion; and the system further comprising instructions to:
determine that the access control data associated with the first data specifies the first recipient is not permitted to receive data associated with the second semantic category; and
wherein the generation of the second data comprises replacing the second portion of the individual ones of the one or more images with other data, wherein the other data comprises one or more of:
output from a blurring algorithm,
output from an edge detector algorithm,
a previously stored image, or
null values.

17. The system of claim 13, further comprising instructions to:

process at least part of the first data to determine a first set of feature vectors associated with the first portion;
generate synthetic data using the first set of feature vectors as input to a generative adversarial network; and
wherein the generation of the second data comprises replacing the first portion of the individual ones of the one or more images with the synthetic data.

18. The system of claim 13, further comprising instructions to:
send at least a portion of the semantic data to the first recipient.

19. The system of claim 13, wherein the semantic data is further indicative of a second portion of the individual ones of the one or more images and a second semantic category associated with the second portion; and the system further comprising instructions to:
determine that the access control data associated with the first data specifies a second recipient is permitted to receive data associated with the second semantic category;
wherein the second data omits the second portion;
generate third data based on the first data, the semantic data, and the access control data, wherein the third data omits the first portion; and
send the third data to the second recipient.

20. The system of claim 13, further comprising instructions to:
determine a confidence value that is indicative of a likelihood that the first semantic category is correctly associated with the first portion;
determine the confidence value is less than a threshold value; and
wherein the generation of the second data comprises replacing the first portion of the individual ones of the one or more images with other data, wherein the other data comprises one or more of:
output from a blurring algorithm,
output from an edge detector algorithm,
a previously stored image, or
null values.

21. The system of claim 13, wherein the first data comprises first audio data and the second data comprises second audio data; and the system further comprising instructions to:
process the first audio data to determine second semantic data indicative of at least a portion of the first audio data; and
generate the second audio data based on the first audio data, the second semantic data, and the access control data.

* * * * *